US007890659B2

(12) United States Patent
Pasha et al.

(10) Patent No.: US 7,890,659 B2
(45) Date of Patent: Feb. 15, 2011

(54) CONFORMING WEB SERVICES TO AN UPDATED CONTRACT

(75) Inventors: Azmat A. Pasha, Mercer Island, WA (US); William E. Gibson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 11/304,300

(22) Filed: Dec. 15, 2005

(65) Prior Publication Data

US 2007/0143501 A1 Jun. 21, 2007

(51) Int. Cl.
G06F 15/16 (2006.01)
G06F 15/173 (2006.01)

(52) U.S. Cl. ............... 709/246; 709/201; 709/202; 709/223; 709/227; 709/229

(58) Field of Classification Search ............. 709/201, 709/202, 223, 227, 246
See application file for complete search history.

(56) References Cited

U.S. PATENT DOCUMENTS

| 6,148,290 | A | 11/2000 | Dan et al. | |
|---|---|---|---|---|
| 2003/0191798 | A1 | 10/2003 | Shimizu et al. | |
| 2003/0208533 | A1* | 11/2003 | Farquharson et al. | 709/203 |
| 2003/0217044 | A1* | 11/2003 | Zhang et al. | 707/3 |
| 2003/0220925 | A1* | 11/2003 | Lior | 707/10 |
| 2004/0030740 | A1* | 2/2004 | Stelting | 709/201 |
| 2004/0193635 | A1* | 9/2004 | Hsu et al. | 707/102 |
| 2005/0038708 | A1* | 2/2005 | Wu | 705/26 |
| 2005/0091230 | A1* | 4/2005 | Ebbo et al. | 707/100 |
| 2005/0114515 | A1* | 5/2005 | Droms | 709/227 |
| 2006/0041579 | A1* | 2/2006 | Miyashita et al. | 707/102 |
| 2006/0251125 | A1* | 11/2006 | Goring et al. | 370/503 |
| 2007/0067388 | A1* | 3/2007 | Angelov | 709/204 |
| 2007/0067479 | A1* | 3/2007 | Angelov | 709/231 |
| 2007/0073769 | A1* | 3/2007 | Baikov et al. | 707/104.1 |

FOREIGN PATENT DOCUMENTS

WO WO 02-46909 6/2002

* cited by examiner

*Primary Examiner*—Wing F Chan
*Assistant Examiner*—David X Yi
(74) *Attorney, Agent, or Firm*—Workman Nydegger

(57) ABSTRACT

Example embodiments address current problems associated with changes in service contracts by providing automated mechanisms to update portions of an existing service implementation. For example, one mechanism modifies an implementation's skeleton (e.g., methods, method signatures, data structures, etc.) in order to conform to changes to an NPDL (e.g., WSDL) contract. In such an embodiment, the developer may only need to make the necessary changes, if any, to the business logic, which typically will not be known from the contract definition. Accordingly, such automatic modifications to the implementation facilitate a developer's adopting a contract based approach to web service development.

16 Claims, 4 Drawing Sheets

CONFORMING WEB SERVICES TO AN UPDATED CONTRACT

CROSS-REFERENCE TO RELATED APPLICATIONS

N/A

BACKGROUND

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web services have been a driving force in advancing such communications between computer systems and are turning the way software built and used inside-out.

Web services let applications share data, and—more powerfully—invoke capabilities from other applications without regard to how those applications were built, what operating system or platform they run on, and what devices are used to access them. Web services may be invoked over the Internet by means of industry-standard protocols including SOAP (Simple Open Access Protocol), XML (eXtensible Markup Language), UDDI (Universal Description Discovery Integration), WSDL (Web Service Description Language), etc. Although web services remain independent of each other, they can loosely link themselves into a collaborating group that performs a particular task.

Often, electronic communication on a web service network includes a client computer system (hereafter referred to as a "client") requesting access to a network service (e.g., web services) at a server computer system (hereinafter referred to as a "server," "service," or "web service"). Accordingly, the client sends a request to the service for particular access to its system resources, wherein the service responds with a response message providing the desired information. Of course, other messaging patterns between client and service may be available and include simple singleton messages as well as more sophisticated multi-message exchanges like, e.g., notifications, solicit-response, pub-sub patterns, polling, kick-push, queuing, and others. In addition, there may be other procedures needed for accessing the service resources, such as authentication and validation mechanisms.

Regardless of the type of message patterns and or procedures used to access a service, web services provide interoperability in a platform agnostic way because both clients and services agree on a basic contract. Represented by a mixture of machine-readable and human languages, such contracts define, among other things, the operations—units of functionality—offered by the web service and/or the format of the messages passed to and/or returned by each operation when invoked. Network Protocol Description Languages (e.g., WSDL) provide an overall wrapper or specification for describing web service contracts in a common or standard language. Such specifications make it easy for developers and developer tools to create and interpret contracts; and also have extensive tooling suites, which in large part accounts for their popularity.

A contract for a web service may either be written independently of the service implementation (e.g., one that includes business logic from another organization) or may be produced by some automated means to reflect the behavior of an existing service. Increasingly, developers need the ability to precisely state the contract independently of the implementation. For example, interoperability scenarios between multiple enterprises, or groups or teams within the same enterprise, often use a "contract-first" or "contract-driven" development strategy. In such instances, once a contract has been agreed upon between the participating parties, specific implementation(s) of the web service can be created to conform to the business logic of the various endpoints. Existing tools allow the generation of a "skeleton" web service implementation based on the web service contract, which then allow a developer to complete the details of the business logic for each operation provided by the service. Typically, such skeleton implementations comprise a class for the service with methods for each operation as defined by the contract. Further, each method's signature describes the messages sent to and/or returned by the operation, with additional classes created where required to describe message data structures referenced in the signature.

Often times, however, the web service contract changes after the implementation of the web service has begun. For example, the contract may need changes to meet new or modified business requirements or in the case where developers use iterative or incremental development strategies. Accordingly, changes to the web service contract typically require changes to both the skeleton (the methods, signatures, and classes or data structures) and the business logic in order to conform to the updated service contract. Current tools, however, do not support updating the web service implementation to accommodate changes to the contract.

Accordingly, a developer has few options available for modifying a web service implementation to conform to the updated web service contract. For example, the developer will typically either: (1) recreate a new service implementation from the revised contract using existing tools (e.g., skeleton tool) and manually migrate those aspects of the prior service implementation they wish to retain; or (2) manually edit the existing implementation code to make the changes necessary to conform to the revised contract. Depending on the scope of the change, both approaches are labor intensive and subject to human error. In addition, these approaches may require that the developer have intimate knowledge of the NPDL language (e.g., WSDL) and/or the schema used (e.g., XML schema) so that they understand the nature of the change and how to map this to their implementation. Due to the complexities in such languages and schemas, however, such modifications are beyond the typical skill set of most developers.

BRIEF SUMMARY

The above-identified deficiencies and drawbacks of current mechanisms for modifying a service implementation in response to changes in a contract are overcome through example embodiments disclosed herein. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for automatically changing at least a portion of a service implementation in response to changes in a web service contract document. In this embodiment, a web service implementation that has been constructed in accordance with a first web service contract document is received. The first web service contract document describes how the web service implementation is to communicate with service(s). In addition, a second web service contract document which differs from the first web service contract document is also received. The one or more changes affect the behavior of the web service implementation in such a way that the web service implementation cannot communicate with endpoints that expect the second contract to be implemented. Thereafter, the one or more changes between the web service implementation and the second contract document are identified. Based on this identification, a portion of the web service implementation is automatically modified such that the web service implementation at least partially conforms to the second web service contract document.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
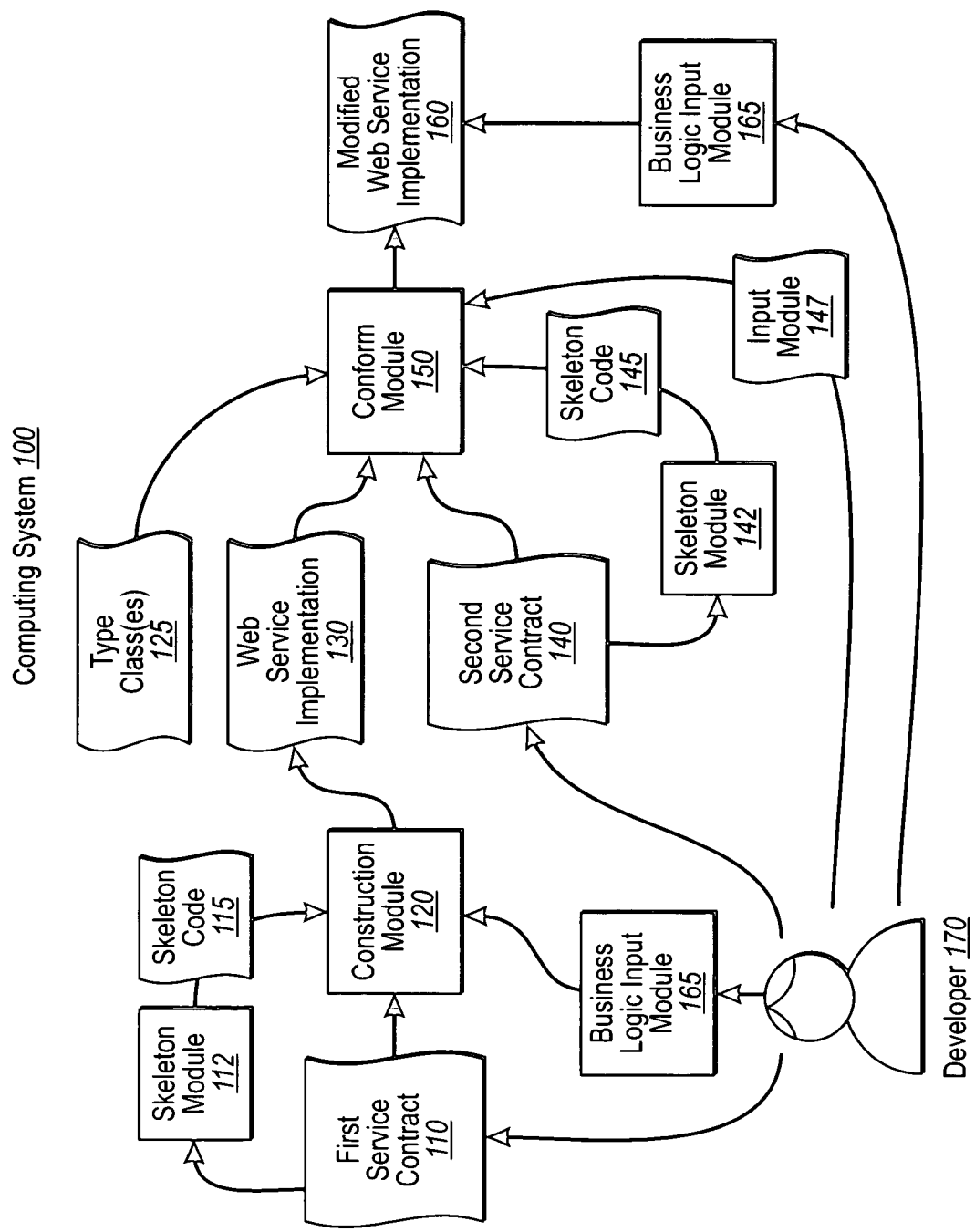
FIG. 1A illustrates a distributed computing system for automatically modifying a web service implementation in response to changes to a web service contract document in accordance with example embodiments.

The present invention extends to methods, systems, and computer program products for automatically modifying or updating a service implementation in accordance to changes in a web service contract document. The embodiments of the present invention may comprise a special purpose or general-purpose computer including various computer hardware or modules, as discussed in greater detail below.

Example embodiments address the problems associated with changes in service contracts by providing automated mechanisms to update portions of an existing service implementation. For example, one mechanism modifies an implementation's skeleton (e.g., methods, method signatures, data structures, etc.) in order to conform to changes to an NPDL (e.g., WSDL) contract. In such an embodiment, the developer will usually only need to make the necessary changes, if any, to the business logic, which typically will not be known from the contract definition. Accordingly, such automatic modifications to the implementation facilitate a developer's adopting a contract based approach to web service development.

For instance, one example embodiment takes as inputs: a service implementation; the type of class(es) used by the web service; a web service contract; and/or other input information (e.g., mapping information for bindings). Using a specified web service contract that is different to the contract currently implement by the web service, the current implementation is updated such that its class, class attributes, methods, method attributes, method signatures, and other various data structures or properties conform to the specified contract. Note, however, that the updated web service implementation might not compile or run after being conformed. Accordingly, to complete the process the developer may need to inspect the changes made and do one or more of the following: (1) provide appropriate business logic and/or method body code for methods added that correspond to operations present in the new contract but absent in the prior contract; (2) modify business logic and/or method body code as required for methods whose signature has changed and which require new or change behavior and/or reference new and/or changed types in the signature; or (3) optionally remove methods that are no-longer mapped to operations as a result of operations previously present being removed from the contract.

Note that embodiments herein allow for the preservation of portions of the methods (e.g., the user-written business-logic) in the updated implementation, which may include valuable information or represent the result of significant effort that the user may wish to use in some other context. For instance, where the change in implementation results from an operation being renamed, the method body code preserved may simply need to be moved to the newly named method. Further, the preservation of the method may be some form of commenting out the method(s), method attribute(s), method signature, etc. In addition, other embodiments also allow for the generation of comments during the process of conforming the implementation to the updated contract, thus making it even easier for the developer to identify the work required to complete the overall service update activity.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

FIG. 1A illustrates a computing system 100 for automatically modifying at least a portion of a web service implementation to conform to an updated web service contract document. Computing system 100 depicts various modules and components that can be used when implementing the embodiment. These various modules and components may be combined into a single module and implemented using software, hardware, or a combination thereof. Further, these modules/components may be included in same computer or they may be distributed in any number of systems. Of course, other configurations and mechanisms for performing the functionality provided by embodiments described herein are also available to present embodiments. Accordingly, the computing system 100 is used for illustrative purposes only and is not meant to limit or otherwise narrow the scope of embodiments herein.

Regardless of the type or configuration of computing system 100, computing system 100 receives or otherwise accesses a first contract or description (used herein interchangeably) document 110, which defines how a web service implementation is to communicate with services or endpoints provided therein (note that the term "endpoint" as used herein may include a client, service, or any other entity configured to communicate with a service in accordance with a contract). As mentioned previously, in some embodiments, first contract document 110 may be agreed upon and generated by one or more developers 170 prior to the construction of the web service implementation 130. Developer 170 may be considered to be an individual developer 170 or a team of two or more developers 170 or enterprises, the exact number or makeup being unimportant to the embodiments described herein. In addition, any one of the aforementioned entities (individually or combined) may generate the various documents described as being generated by a developer 170.

Regardless of who or how the web service description 110 is created, the first contract 110 will typically describe the behavior of one or more services provided. Accordingly, the first description 110 describes, among other things, the operation(s) provided, the format of the messages exchanged, as well as other properties. Note that this list is neither inclusive nor exhaustive. For example, an operation of a service may receive an input message but not return an output message. In addition, there may be other behaviors and data objects within the first (and other) description 110 that are not listed here. Accordingly, the list of behaviors and data objects provided herein is for illustrative purposes only and is not meant to limit or otherwise narrow the scope of embodiments unless explicitly claimed.

Also note that the web service contract documents of FIG. 1 (e.g., first contract document 110 and second contract document 140) may be designated as WSDL contract documents because of the widespread use in the art of such format. As previously mentioned, however, WSDL is only one example format for a Network Protocol Description Language (NPDL). Accordingly, the WSDL designation should not be used to limit the scope of the disclosed embodiments or the appended claims unless otherwise expressly claimed.

Figure 1B:
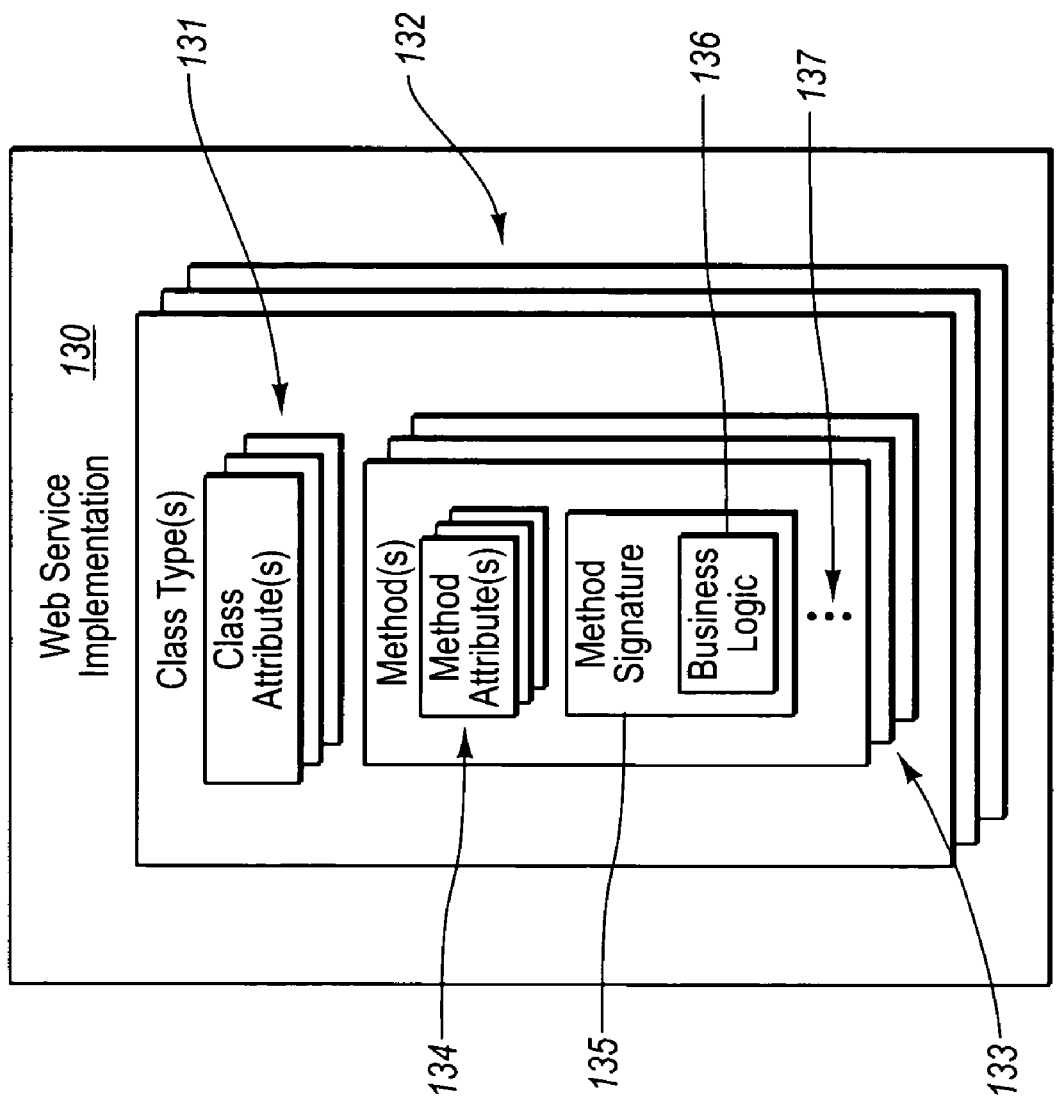
FIG. 1B illustrates an example of a service implementation.

Nevertheless, the web service contract 110 may be used to create a web service implementation 130. For example, construction module 120 can be used to take data included within first web service description 110 to generate a specific implementation 130. As shown in FIG. 1B, a web service implementation 130 can include web service class type(es) 132 used by the service, which will typically have various class attribute(s) 131 associated therewith. The web service class 132 defines the actual implementation 130 of the web service including the various method(s) 133 offered. As previously mentioned, web services define the type of messages they accept using operations as defined within the service contract (e.g., first contract document 110). These operations correlate to each of the web service method(s) 133 within a web service implementation 130.

Each method 133 has associated therewith various method attribute(s) 134 and other data structures and properties 137. In addition, a method 133 typically also includes the method signature 135 that defines such things as the method name, method type, expected input parameter(s) and/or return type(s) of the method 133. In addition, as will be described in greater detail below, the method signature will typically include business logic 136 as defined by the developer 170. Of course, other properties such as messaging format (e.g., SOAP), binding protocols, etc., may also be defined within the method 133, method attributes 134, method signature 135, and/or other data structures or properties 137.

By way of example, and not by limitation, a web service implementation 130 created using construction module 120 may be of a class type 132 "arithmetic", which has various class attributes 131 and methods 133. For example, the methods 133 in this instance may include "addition", "subtraction", "multiplication", "division", etc. The method attributes 134, method signature 135, and other data structures or properties 137 may further define for each method 133 the name of a specific operation (e.g., divide), the method type (e.g., division), the number of integers required for input (e.g., two), the type of output that will result (e.g., a single INT), the format of both input and/or output (e.g., SOAP messages), as well as any other appropriate properties.

Note that method(s) 133 of a class type 132 implementing a service are usually not automatically mapped to an operation in the web service definition (e.g., first contract document 110). For example, typical tools (e.g., skeleton module 112) create skeleton code 115 that define among other things, the method(s) 133, method attribute(s) 134, method signatures 135, class types 132, etc., without the business logic 136 needed for full implementation. Consequently, the developer 170 will typically need to manually state (using, e.g., business logic input module 165) which methods 132 should be exposed as service requests and responses in the service definition. In addition, the developer 170 needs to complete the detail of the business logic 136 for each operation as defined by the first contract 110 for the service. Note, however, that in some embodiments, the intermediary step of creating the skeleton code 115 and then generating the web service implementation 130 is optional.

As mentioned, construction module 120 produces web service implementation 130. Web service implementation 130 may include the classes, methods, method attributes, web signatures, message types, etc. as dictated by first NPDL (e.g., WSDL) contract 110 and may also include the specific business code that implements the behaviors of web service is going to offer. When compiled, web service implementation 130 should perform the behaviors dictated by the NPDL contract.

Regardless of how the web service implementation 130 is produced, as previously mentioned the first service contract 110 may change after the web service implementation 130 was created. For example, a developer 170 may produce a second service contract 140 that updates, modifies, or otherwise fully replaces the first service contract 110. These changes may include, among other things, changes to operation(s) provided, the format of the messages exchanged, as well as other properties. Accordingly, endpoints that use the web service implementation 130 generated using the first contract 110 may no longer be able to communicate with the services specified within the second contract 140. (Note, however, that in some instances changes to the first contract 110 do not necessarily mean that an endpoint that uses the original service implementation 130 cannot communicate with the services provided in the second contract 140.)

For instance, in the above example of an "arithmetic" class type, a developer may subsequently change the number and/or type of inputs. For example, assume that the first contract 110 allowed a method of "addition" to have open ended array of inputs. A developer 170 may wish to constrain the number of inputs for such reasons as reducing a potential security risk prone to such things as a denial of service attacks, or for any other reason. Accordingly, the developer 170 may change the first contract 110 (i.e., create a second contract 140) to only allow for a limited array of inputs, e.g., five explicit numeric arguments. If the current web service implementation 130 was created to have the open ended array, then inputs of greater than five may no longer be able to communicate with the service in accordance with the second contract 140.

Example embodiments therefore provide a conform module 150 used to automatically evaluate changes between the web service implementation 130 and the second contract 140 and modify at least a portion of the implementation 130. Such module 150 essentially provides a differencing system that creates a new set of class(es) from the second contract 140 and compares the new class(es) to the existing class(es) in the implementation 130, making changes as required. Such changes ensure, e.g., that the implementation skeleton (e.g., class, class attributes, methods, method signatures, method attributes, data structures, etc.) conforms to the second contract 140. For example, the compare module may take as inputs one or more of: the web service implementation 130; the type class(es) 135 currently and/or previously used by the service; the updated or second service contract 140; and/or the original or first service contract 110. Based on changes identified between the implementation 130 (and/or first contract 110 as the case may be) and second 140 contract, one or more portions of the web service implementation 130 may be modified to generate a web service implementation 160 in an attempt to conform the original implementation 130 to the second contract 140.

Note that example embodiments provide that portions of the methods within the implementation 130 (e.g., the business logic) will typically remain unchanged in the modified implementation 160. For example, as described in greater detail below, removal of an operation may cause the corresponding method to be commented out or otherwise flagged, moved, etc. Accordingly, the modified implementation 160 may not compile or run. As such, in order to complete the process the developer 170 may need to use the business logic input module 165 (or other module) to do one or more of the following: (1) provide appropriate business logic and/or method body code for methods added that correspond to operations present in the new contract but absent in the prior contract; (2) modify business logic and/or method body code as required for methods whose signature has changed and which require new or change behavior and/or or reference new and/or changed types in the signature; or (3) optionally remove methods that are no-longer mapped to operations as a result of operations previously present being removed from the contract.

Regardless of whether or not the business logic for the modified implementation 160 is needed, the inputs used to modify the service implementation 130 to conform to the second contract 140 may vary. For example, conform module 150 will typically need to take as an input the web service implementation 130. The other inputs, however, may vary depending on how the changes are identified. For example, the type class(es) 135 from the second service contract 140 may be identified and compared directly to the class(es) within the web service implementation 130. Alternatively, or in addition, the skeleton code 145 of the second service contract 140 may be generated using skeleton module 142, which can then be compared with the skeleton code 115 for the first contract 110 for identifying changes thereto.

Of course, other inputs for identifying the changes between the web service implementation 130 and the second service contract 140 are also available and contemplated herein. For example, as described in greater detail below, there may be instances wherein user input or other parameters are needed for determining various specifications needed to complete the modified service implementation 160. Accordingly, as shown in FIG. 1A, example embodiments provide an input module 147 that allows a developer 170 (or some automated mechanism within the input module 147) to define other parameters (e.g., specifying the mapping of a particular binding) used by conform module 150 for generating modified service implementation 160. Accordingly, any particular inputs used by conform module 150 for identifying changes between the implementation 130 and the second contract 140 are used herein for illustrative purposes only.

Note also that most any portion of the implementation 130 may be automatically modified or updated to conform to the second service contract 140. For example, the class attributes may not have changed, however, the method, method signatures, method attributes, or other properties may have. Accordingly, example embodiments are configured to identify most any change that occurs to the implementation skeleton (i.e., class types, class attributes, methods, method attributes, method signatures (including name, types, parameters, business logic, etc.), data structures, or other properties). As such, any specific portion of the implementation 130 modified is used herein for illustrative purposes only and is not meant to limit or otherwise narrow the scope of embodiments herein unless explicitly claimed.

As mentioned above, embodiments herein allow for the preservation of portions of the method(s) such as the user-written business logic in the updated or modified implementation 160, which may include valuable information or represent the result of significant effort that the user may wish to use in some other context. For instance, where the change in implementation 130 results from an operation being renamed, the method body code preserved simply needs to be moved to the newly named method. Note that the preservation of the business logic or other portions of a method may occur in any number of ways. For example, the name of operation that changed may not cause the renaming of the corresponding method. Further, the cancellation of an operation from the first contract 110 may cause the commenting out, removal of attributes, or other marks that signify that the method is not to be exposed as an operation of the web service, or otherwise marking of the prior method and its contained business logic such that it is not removed.

In addition, other embodiments also allow for the insertion of comments during the process of generating the modified implementation 160. For example, the comments may include such information as what date and time the change occurred and/or what caused the change. Of course, other information may also be provided. Nevertheless, the additional comments further assist the developer 170 to identify the work required to complete the overall service update activity.

Figure 3:
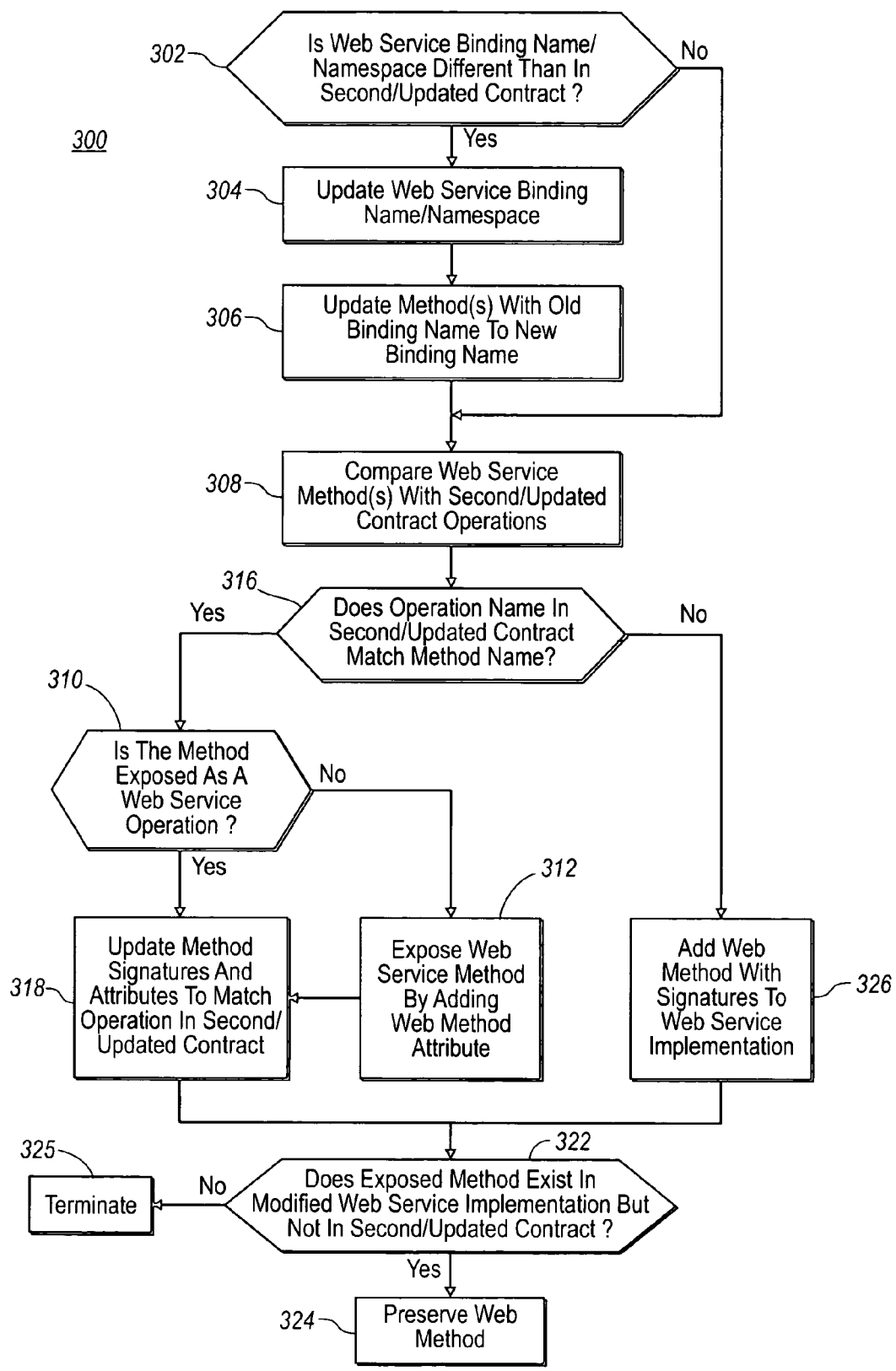
FIG. 3 illustrates a detailed flow diagram for a specific system that automatically modifies a service implementation in response to changes to a web service contract document in accordance with example embodiments.

In order to more fully appreciate embodiments described herein, FIG. 3 provides a flow diagram of a specific system that may be used in practicing embodiments describe herein. Note that the determination of specific inquires may occur in different order than that shown in the diagram. Further, the specific inquires used are also for illustrative purposes only and are not meant to limit or otherwise narrow the scope of embodiments described herein.

The specific logic shown in FIG. 3 is fundamentally a differencing system; it creates a new set of classes from the service contract and then compares the new classes to the existing classes in the implementation, making changes as required. The flow diagram addresses various aspects of changes to the service implementation in turn. For example, first it modifies the attributes on the Web service class so that it conforms to the Web service specifications in the updated service contract. The diagram then addresses each operation referenced by each message binding (e.g., SOAP) and ensures there is a matching method present with a web method attribute and removes the web method attribute from all other methods. It then addresses the schema types (e.g., XML) referenced in the message definitions and either, as a selectable user option, creates a replacement set of data serialization classes or updates the existing classes.

As shown, the system first determines if the web service binding name and/or binding namespace of the web service implementation is different from the second/updated web service contract (decision block 302). If the web service binding name and/or binding namespace is different (Yes in decision block 302), then the system will automatically update 304 the web service binding name and/or binding namespace. Note, however, that the service name/namespace should typically not be updated because a developer may have decided to offer the behavior under a different service name even though they retain the binding name and namespace. It is the binding name and namespace that define the behavior type and are used for matching with the second/updated web service contract, not the service name For example, suppose that the binding name and binding namespace changed from the defaults of WebService1 & http://tempuri.org to GolfCatalog & http://catalog.org. The following code modification may automatically occur in the web service implementation:

Before conforming to the second web service contract:

```
[System.Web.Services.WebServiceBinding(Name = "WebService1")]
public class WebService1 : System.Web.Services.WebService
```

After automatically conforming to the second web service contract document:

```
[System.Web.Services.WebServiceBinding(Name = "GolfCatalog",
Namespace = "http://catalog.com")]
public class WebService1 : System.Web.Services.WebService
```

Note that in the above example, the service name did not change with the update in binding name and namespace.

After updating the web service binding name and namespace, the system may then automatically update 306 methods of the web service implementation that include the old binding name to include the new binding name. For example, the following pseudo-code modification may automatically occur in the web service implementation after changing the binding name "WebService1" to "GolfCatalog": Before conforming to the second web service contract:

```
[System.Web.Services.WebMethod(...)]
[System.Web.Services.Protocols.SoapDocumentMethod(Binding =
"WebService1")]
public void getCatalog( )
```

After automatically conforming to the second web service contract document:

```
[System.Web.Services.WebMethod(...)]
[System.Web.Services.Protocols.SoapDocumentMethod(Binding =
"GolfCatalog")]
public void getCatalog( )
```

After updating the methods with the new binding name or if the web service binding name or binding namespace were not different from the second service contract (No in decision block 302), the system updates method signatures and attributes to conform to the operations in the second/updated service contract for each method in the web service implementation that matches an operation name in the web service contract. For each operation in the second/updated contract, the system then compares 308 the web service implementation method(s) with the second/updated service contract operation(s). For example, the method names can be compared with the operation names—assuming a one-to-one binding correlation as discussed in greater detail below. If a match exists (Yes in decision block 316), the system then determines if the method is exposed as a web service operation (decision block 310). If there are one or more methods not exposed as web service operations (No in decision block 310), the methods are automatically exposed 312 by adding a web method attribute(s) to the unexposed method. This accommodates, e.g., an upgrade scenario for users who have used interfaces on which the web method attributes are defined and have not defined web method attributes on the class itself.

Otherwise, if the matching method is exposed (Yes in decision block 310 and/or from the newly exposed service methods in block 312), then implementation method signatures and attributes of the exposed web methods are automatically updated 318 to conform to the second/updated web service contract. Note that the system may not change the method/message name and the web method attribute.

For example, if the second/updated web service contract stated that the getCatalog operation now took ProductId as a parameter, and returned a System.Xml.Xmldocument, the following updates may automatically occur:

EXAMPLE 1

Before conforming to the second web service contract:

```
[System.Web.Services.WebMethod(EnableSession = true)]
[SoapDocumentMethod(...)]
public void getCatalog( )
```

After automatically conforming to the second web service contract document:

```
[System.Web.Services.WebMethod(EnableSession = true)]
[SoapDocumentMethod(...)]
public System.Xml.XmlDocument getCatalog(String ProductId)
```

EXAMPLE 2

Before conforming to the second web service contract:

```
[System.Web.Services.WebMethod(MessageName = "getCatalog", ,
EnableSession = true)]
[SoapDocumentMethod(...)]
public void getGolfCatalog( )
```

After automatically conforming to the second web service contract document:

```
[System.Web.Services.WebMethod(MessageName = "getCatalog", ,
EnableSession = true)]
[SoapDocumentMethod(...)]
public System.Xml.XmlDocument getGolfCatalog(String ProductId)
```

The system can also automatically update attributes in the web service implementation. For example, if the second/updated web service contract document stated that the body style should be in RPC and not Document, then the following update may occur:

Before conforming to the second web service contract:

```
[System.Web.Services.WebMethod(EnableSession = true)]
[System.Web.Services.Protocols.SoapDocumentMethod(Binding =
"WebService1")]
public void getCatalog( )
```

After automatically conforming to the second web service contract document:

```
[System.Web.Services.WebMethod(EnableSession = true)]
[System.Web.Services.Protocols.SoapRpcMethod(Binding =
"WebService1")]
public void getCatalog( )
```

Note that the method signatures may include primitive message types such as string or integer, which are also subject to change when being modified to conform to the second/updated web service contract document. One way to update the implementation may be to simply replace the primitive type. There are, however, instances where the developer may want to preserve the unique functionality of the primitive type. Accordingly, embodiments allow the system to add an attribute to the message that will not be included as part of the serialization such that it leaves the method unexposed. This helps ensure that the functionality is not removed, but is available for other developer use while not being implemented in a modified web service implementation.

Returning to decision block 316, if the operation name in the second/updated contract does not match a method name (No in decision block 316), the system automatically exposes the remaining methods (i.e., operations within the updated contract and/or methods within the original implementation) by adding web method(s) with signatures to the modified service implementation (as shown in block 326).

Once all methods within the modified implementation are exposed (i.e., either exiting decision block 318 or 326), for each method within the modified implementation, the system determines if the exposed method(s) exist in the modified web service implementation but not in the second/updated web service contract document (decision block 322). If the exposed method(s) exist in the modified web service implementation and in the second/updated contract, then the system terminates 325 (No in decision block 322). Otherwise, if the exposed operation does exist in the modified web service implementation but not in the second/updated web service contract document (Yes in decision block 322), at least a portion of the web method is preserved. For example, the method, method attribute, method signature, or other data structure may be automatically commented out such that the method is no longer exposed as a web service operation. Alternatively, the method, method attribute, method signature, etc., may be otherwise removed and stored elsewhere for future reference. In addition, the system may add an additional comment that states when and why the method is no longer exposed. This ensures that the web method with the corresponding method signatures, parameters, and/or any specific business logic is not removed from the web service implementation, but will simply not compile.

For example, if the getCatalog operation was automatically commented out, the following modification may occur:

Before conforming to the second web service contract:

```
[System.Web.Services.WebMethod(MessageName = "Catalog",
EnableSession = true),
System.Web.Services.Protocols.SoapDocumentMethod(Binding =
"WebService1")]
public void getCatalog( )
```

After automatically conforming to the second web service contract document:

```
/// [7/2/2004 4:10 PM] The WebMethod attribute was removed as this
operation no longer conforms to the WSDL.
/// [System.Web.Services.WebMethod(MessageName = "Catalog",
EnableSession = true),
[System.Web.Services.Protocols.SoapDocumentMethod(Binding =
"WebService1")]
public void getCatalog( )
```

In some embodiments, a developer may then inspect the modified web service implementation and may perform additional modifications. For example, when the modified web service is complied or run, one or more errors may occur. To remedy the errors, a developer may modify the implementation as previously described.

As previously mentioned, the above system may need further input parameters from either a user or other automated mechanism for further defining which methods should be exposed in the modified implementation. For example, the above specified system assumed a single specific mapped pair of bindings between implementation and contract—i.e., a one-to-one correlation. Contracts (e.g. WSDL documents), however, may include multiple bindings (each binding defining a discrete set of operations) when mapping a contract to an implementation. For example, there may be instances where multiple versions are supported within a contract; thus the name or namespace might for instance include a version identifier (note that such changes to the name and/or namespace are typical when any material change is made to the behavior or signature of any operation in the binding).

Accordingly, operations of the same name might occur on different bindings so operation name mapping alone may be insufficient, since a binding is fully identified by name and namespace properties—which are in the contract and recorded as attributes in the implementation code so they can be correlated. In such case that multiple sets of operations (bindings) are defined in the contract, then the system may require additional input if only part of the names (i.e., either the name or namespace) of these sets have changed between the first and second contract. Such input could be provided in the form of either direct user input during execution of the implementation modification or as parameters to the execution, which may specify the mapping.

In other words, the above described system, as well as embodiments described below, may need to be executed in the following context: (1) a contract and an implementation with a single binding each (i.e., a one-to-one correlation), in which case the binding in the contract and its operations are used to conform the implementation regardless of names and/or namespaces; (2) the contract and/or implementation have multiple bindings and the name and namespace must match exactly for the conformance to take place (any bindings in the contract not in the implementation may be added to the implementation or any binding in the implementation not in the contract should be removed, e.g., by commenting it out); and (3) mapping instructions have been provided (through, e.g., user input or other automated way), which explicitly identify which bindings in the contract should be mapped to which bindings in the implementation (any unmapped bindings could be ignored or treated as in (2)). Note, however, that how mapped and unmapped bindings are handled is used herein for illustrative purposes and should not limit or otherwise narrow the scope of embodiments described herein unless explicitly claimed.

The embodiments described herein may also be described in terms of methods comprising functional steps and/or non-functional acts. Some of the following sections provide descriptions of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIG. 2—is used to indicate the desired specific use of such terms.

Figure 2:
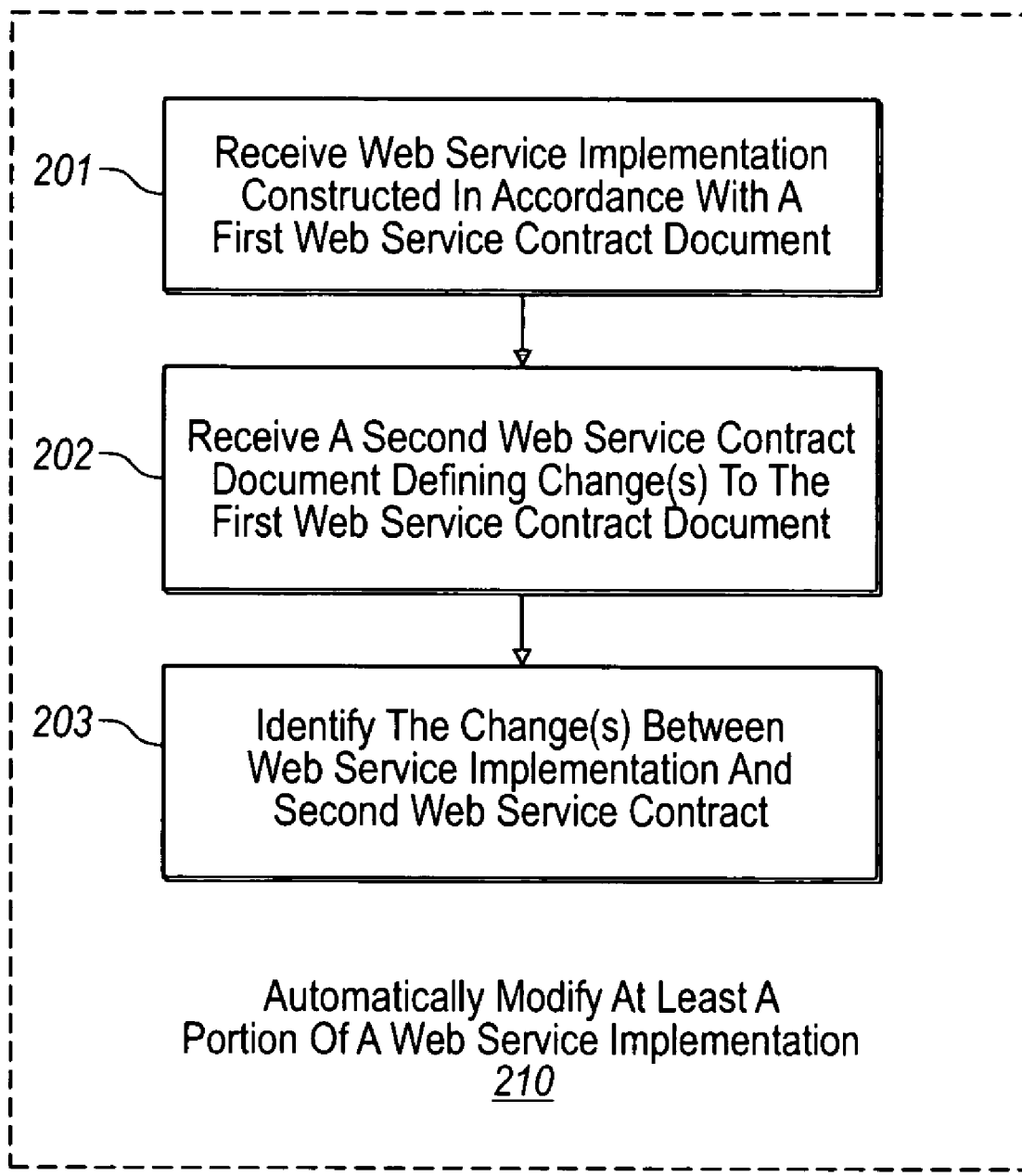
FIG. 2 illustrates a flowchart of a method for automatically modifying a service implementation in response to changes to a web service contract document in accordance with example embodiments.

As previously mentioned, FIG. 2 illustrates a flowchart for various exemplary embodiments of the present invention. The following description of FIG. 2 will occasionally refer to corresponding elements from FIGS. 1A and B, and 3. Although reference may be made to a specific element from these Figures, such references are used for illustrative purposes only and are not meant to limit or otherwise narrow the scope of the described embodiments unless explicitly claimed.

Turning now to FIG. 2, a flowchart of a method 200 for automatically modifying a web service implementation to conform with changes to a web service contract is illustrated. Method 200 includes a step for automatically modifying 210 a portion of a web service implementation. For example, conform module 150 can be used to automatically modify a portion of web service implementation 130. Such modification will typically preserve one or more portions of methods (e.g., the business logic) included therein. Further, such modification may include one or more of the following: updating the web service implementation binding name or namespace 304 if either one are different from the second web service contract 140; preserving a web method 324 for an operation that is not included in the second web service contract document 140; adding a method with method signature and attributes for operations that are included in the second web service contract but not in the web service implementation 326; modifying a method signature for web methods that match an operation 318; adding an attribute to a method such that the method is exposed as an operation; and/or removing an attribute to a method such that the method is no longer exposed as an operation, yet the content of the method is preserved.

Step for 210 includes an act of receiving 201 a web service implementation that has been constructed in accordance with a first web service contract document. For example, web service implementation 130 may be received by conform module 150. The web service implementation may be constructed in accordance with first service contract document 110. As previously described, the first contract 110 will typically describe the behavior of one or more services provided. Accordingly, the first description 110 describes, among other things, the operation(s) provided, the format of the messages exchanged, as well as other properties that define how a web service implementation 130 is to communicate with other services of computing system 100.

Step for 210 further includes an act of receiving 202 a second web service contract document that defines change(s) to the first web service contract document. For example, conform module 150 may receive second web service contract 140, which may include changes to portions of the first service contract 110. Such changes may change the operation(s) provided, the format of the messages exchanged, as well as other properties that define how a web service implementation 130 is to communicate with other services of computing system 100. Note that the changes affect the behavior for the web service implementation 130 in such a way that the web service implementation 130 likely cannot communicate with an endpoint (e.g., client) expecting a service that implements the second web service contract 140. Further note that both the first 110 and second 140 contracts may be some NPDL form such as WSDL.

Step for 210 further includes an act of identifying 203 change(s) between the web service implementation and the second web service contract. For example, conform module 150 or some other component and/or module of computing system 100 may identify change(s) between the web service implementation 130 and the second web service contract 140. In some embodiments, changes to portion(s) of the existing web service implementation (e.g., web service implementation 130) are identified by comparing the service implementation with portion(s) of the second web service contract document (e.g., second service contract document 140). Of course other ways of identifying the changes are also contemplated herein as described above. For example, other embodiments may use skeleton code 145 generated based on the second web service contract 140 and compare such to the web service implementation 130 or the first web service contract 110 for identifying the changes thereto. In any event, once the changes are identified conform module 150 can generate the modified web service implementation 160 as previously described.

Other embodiments further provided for exposing the modified portion of the web service implementation 160 using business logic input interface or module 165. This allows a developer 170 to perform some of the following: provide appropriate business logic code for methods added to the web service implementation 130 that correspond to operations present in the second web service contract document 140 but absent in the first web service contract document 110; modify existing business logic code for methods whose signatures or message types have been modified to conform to the second web service contract document 140; and remove web methods that are no longer mapped to operations as a result of the operations being present in the first web service contract document 110, but absent in the second web service contract document 140.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. Within a computing system that includes a service implementation of a web service contract document, the contract document defining how the service implementation is to communicate with a particular service, a method of automatically changing at least a portion of the service implementation in response to changes in the web service contract document, the method comprising:

the computing system receiving a web service implementation that has been constructed in accordance with a first web service contract, the first web service contract describing how the web service implementation is to communicate with one or more services and the web service implementation comprising an existing set of classes;

the computing system receiving a second web service contract document, the second web service contract document defining one or more changes to the first web service contract, the changes affecting the behavior of the web service implementation;

creating a new set of classes from the second web service contract document;

comparing the new set of classes to the existing set of classes;

determining if there are changes to a binding name or namespace;

when there are changes to the binding name or namespace, updating one or more methods in the web service implementation to reflect the changes;

determining if an operation name in the second contract does not match a method name in the web service implementation;

when the operation name in the second contract does not match a method name in the web service implementation, then adding a method corresponding to the operation name to the web service implementation;

when the operation name in the second contract matches a method name in the web service implementation, then determining if the method is exposed as a web service operation;

when the method is not exposed as a web service operation, then exposing the method by adding a web method attribute to the unexposed method;

determining if the method exposed in the web service implementation is not exposed in the second contract;

when the method is exposed in the web service implementation but is not exposed in the second contract, then unexposing the method in the web service implementation, preserving the method for future reference, and adding a comment stating when and why the method is no longer exposed;

identifying one or more differences between the web service implementation constructed in accordance with the first web service contract and the second web service contract document; and based on the one or more identified differences, modifying at least a portion of the web service implementation such that the modified implementation's class, class attributes, message exchange format, methods, and method attributes conform to the second web service contract document.

2. The method in accordance with claim 1, wherein the act of identifying one or more differences comprises:

comparing one or more portions of the web service implementation with one or more portions of the second web service contract document.

3. The method in accordance with claim 1, wherein the modification of the at least a portion of the web service implementation preserves one or more portions of one or more methods included therein.

4. The method in accordance with claim 3, wherein the one or more portions of one or more methods included within the web service implementation is preserved by automatically commenting them out.

5. The method in accordance with claim 1, further comprising:

generating skeleton code based on the second web service contract document;

comparing the web service implementation with the skeleton code; and based on the comparison, automatically modifying at least a portion of the web service implementation to conform with the skeleton code.

6. The method in accordance with claim 1, wherein modifying at least a portion of the web service implementation to conform with the second web service contract document includes:
updating the web service implementation binding name or binding namespace.

7. The method in accordance with claim 1, wherein modifying at least a portion of the web service implementation to conform with the second web service contract document includes:
preserving a web method for an operation that is not included in the second web service contract document.

8. The method in accordance with claim 1, wherein modifying at least a portion of the web service implementation to conform with the second web service contract document includes:
adding a method with method signature and attributes for operations that are included in the second web service contract but not in the web service implementation.

9. The method in accordance with claim 1, wherein modifying at least a portion of the web service implementation to conform with the second web service contract document includes:
modifying a method signature for web methods that match an operation.

10. The method in accordance with claim 1, wherein modifying at least a portion of the web service implementation to conform with the second web service contract document includes:
adding an attribute to a method such that the method is exposed as an operation.

11. The method in accordance with claim 1, wherein the first and second web service contract documents are Web Service Description Language (WSDL) documents.

12. The method in accordance with claim 1 further comprising:
exposing the modified at least a portion of the web service implementation using a business logic input interface in order to allow a developer to perform each of:
provide appropriate business logic for web methods added to the web service implementation that correspond to operations present in the second web service contract document but absent in the first web service contract document;
modify business logic for web methods whose signature or method type has been modified to conform to the second web service contract document; and
remove web methods that are no longer mapped to operations as a result of the operations being present in the first web service contract document but absent in the second web service contract document.

13. A computer program product comprising one or more tangible computer-readable storage devices having stored thereon computer-executable instructions, the computer program product for use in a computing system that includes a web service implementation of a web service contract document, which defines how the web service implementation is to communicate with a particular service, the computer program product used in implementing a method of automatically changing at least a portion of the web service implementation in response to changes in the web service contract document, the computer-executable instructions that, when executed by one or more processors of the computing system, cause the computing system to perform a method comprising:

the computing system receiving a web service implementation that has been constructed in accordance with a first web service contract, the first web service contract describing how the web service implementation is to communicate with one or more services and the web service implementation comprising an existing set of classes;
the computing system receiving a second web service contract document, the second web service contract document defining one or more changes to the first web service contract, the changes affecting the behavior of the web service implementation;
creating a new set of classes from the second web service contract document;
comparing the new set of classes to the existing set of classes;
determining if there are changes to a binding name or namespace;
when there are changes to the binding name or namespace, updating one or more methods in the web service implementation to reflect the changes;
determining if an operation name in the second contract does not match a method name in the web service implementation;
when the operation name in the second contract does not match a method name in the web service implementation, then adding a method corresponding to the operation name to the web service implementation;
when the operation name in the second contract matches a method name in the web service implementation, then determining if the method is exposed as a web service operation;
when the method is not exposed as a web service operation, then exposing the method by adding a web method attribute to the unexposed method;
determining if the method exposed in the web service implementation is not exposed in the second contract;
when the method is exposed in the web service implementation but is not exposed in the second contract, then unexposing the method in the web service implementation, preserving the method for future reference, and adding a comment stating when and why the method is no longer exposed;
identifying one or more differences between the web service implementation constructed in accordance with the first web service contract and the second web service contract document;
based on the one or more identified differences, modifying at least a portion of the web service implementation such that the modified implementation's class, class attributes, message exchange format, methods, and method attributes conform to the second web service contract document.

14. The computer program product in accordance with claim 13, wherein the computer executable instructions that are configured to modify at least a portion of the web service implementation to conform with the second web service contract document further include instructions configured to:
update a web service binding attribute if the binding name or the binding namespace are different from the second web service contract.

15. The computer program product in accordance with claim 13, wherein the computer executable instructions that are configured to modify at least a portion of the web service implementation to conform with the second web service contract document further includes instructions configured to:

comment out a web method attribute for an operation that is not included in the second web service contract document.

16. The computer program product in accordance with claim 13, wherein the computer executable instructions that are configured to modify at least a portion of the web service implementation to conform with the second web service contract document further includes instructions configured to:

add a web method with method signature and attributes for operations that are included in the second web service contract but not in the web service implementation.

* * * * *